(12) United States Patent
Roy et al.

(10) Patent No.: US 12,718,018 B2
(45) Date of Patent: Aug. 25, 2026

(54) TEXT SPAN PREDICTION BASED ON ENTITY TYPE

(71) Applicant: Oracle International Corporation, Redwood Shores, CA (US)

(72) Inventors: Suman Roy, Bangalore (IN); Srijon Sarkar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 298 days.

(21) Appl. No.: 18/502,205

(22) Filed: Nov. 6, 2023

(65) Prior Publication Data

US 2025/0148206 A1 May 8, 2025

(51) Int. Cl.
*G06F 40/284* (2020.01)
*G06F 40/40* (2020.01)

(52) U.S. Cl.
CPC ............ *G06F 40/284* (2020.01); *G06F 40/40* (2020.01)

(58) Field of Classification Search
None
See application file for complete search history.

(56) References Cited

U.S. PATENT DOCUMENTS 12,361,218 B2 * 7/2025 Kirch ...................... G06F 40/40
2014/0279729 A1 * 9/2014 Delaney ................ G06F 16/367 706/12
2020/0334416 A1 * 10/2020 Vianu .................. G06N 3/0442

OTHER PUBLICATIONS

Zaratiana et al. "Named Entity Recognition as Structured Span Prediction", UM-IoS, Dec. 7, 2022 (Year: 2022).*
Eberts and Ulges, "An End-to-end Model for Entity-level Relation Extraction using Multi-instance Learning", arXiv:2102.05980v2 [cs.CL] Dec. 3, 2021 (Year: 2021).*
Carlson , et al., "Coupled Semi-Supervised Learning for Information Extraction", Proceedings of the third ACM international conference on Web search and data mining, Feb. 4-6, 2010, 10 pages.
Gu , et al., "An Empirical Study on Finding Spans", Conference on Empirical Methods in Natural Language Processing, Available Online at: https://aclanthology.org/2022.emnlp-main.264.pdf, Oct. 13, 2022, 8 pages.
Lee , et al., "End-to-end Neural Coreference Resolution", Proceedings of the 2017 Conference on Empirical Methods in Natural Language Processing, Available Online at: https://aclanthology.org/D17-1018.pdf, Jan. 2017, 10 pages.

(Continued)

*Primary Examiner* — Nicole A K Schmieder
(74) *Attorney, Agent, or Firm* — Kilpatrick Townsend & Stockton LLP

(57) ABSTRACT

Machine learning techniques directed to span prediction for textual data are disclosed. As used herein, span prediction is the process of predicting the possible spans of text that can be assigned to a given entity type of a set of predefined entity types. To this end, a machine learning model can be trained to generate values that indicate the predicted probability that a given span of an identified set of spans within text of interest is appropriate for association with a given entity type of the set of predefined entity types. The predicted probability values may be used to determine whether a given span or spans is associated with a given entity type. The predicted spans can also be scored in some examples.

19 Claims, 8 Drawing Sheets

(56) References Cited

OTHER PUBLICATIONS

Lee , et al., "Fine-Grained Named Entity Recognition Using Conditional Random Fields for Question Answering", Information Retrieval Technology, Third Asia Information Retrieval Symposium (AIRS), Oct. 16-18, 2006, 9 pages.
Lee , et al., "Learning Recurrent Span Representations for Extractive Question Answering", Available Online at: https://arxiv.org/pdf/1611.01436.pdf, Nov. 4, 2016, pp. 1-9.
Ling , et al., "Fine-Grained Entity Recognition", Available Online at: http://aiweb.cs.washington.edu/ai/pubs/ling-aaai12.pdf, Proceedings of the Twenty-Sixth Association for the Advancement of Artificial Intelligence Conference on Artificial Intelligence, vol. 26, No. 1, Jul. 22-26, 2012, pp. 94-100.
Luan , et al., "Multi-Task Identification of Entities, Relations, and Coreference for Scientific Knowledge Graph Construction", Available Online at: https://arxiv.org/pdf/1808.09602.pdf, Aug. 2018, 14 pages.
Shimaoka , et al., "Neural Architectures for Fine-grained Entity Type Classification", Available Online at: https://arxiv.org/pdf/1606.01341.pdf, Jun. 2016, 10 pages.
Wadden , et al., "Entity, Relation, and Event Extraction with Contextualized Span Representations", Available Online at: https://aclanthology.org/D19-1585.pdf, Jan. 2019, 9 pages.
Wang , et al., "An Enhanced Span-based Decomposition Method for Few-Shot Sequence Labeling", North American Chapter of the Association for Computational Linguistics, Available Online at: https://aclanthology.org/2022.naacl-main.369.pdf, Sep. 27, 2021, 13 pages.
Wu , et al., "Enriching Pre-trained Language Model with Entity Information for Relation Classification", Conference: the 28th Association for Computing Machinery (ACM) International Conference, Nov. 2019, 6 pages.
Zhong , et al., "A Frustratingly Easy Approach for Entity and Relation Extraction", Proceedings of the 2021 Conference of the North American Chapter of the Association for Computational Linguistics: Human Language Technologies, Jan. 2021, 12 pages.

* cited by examiner

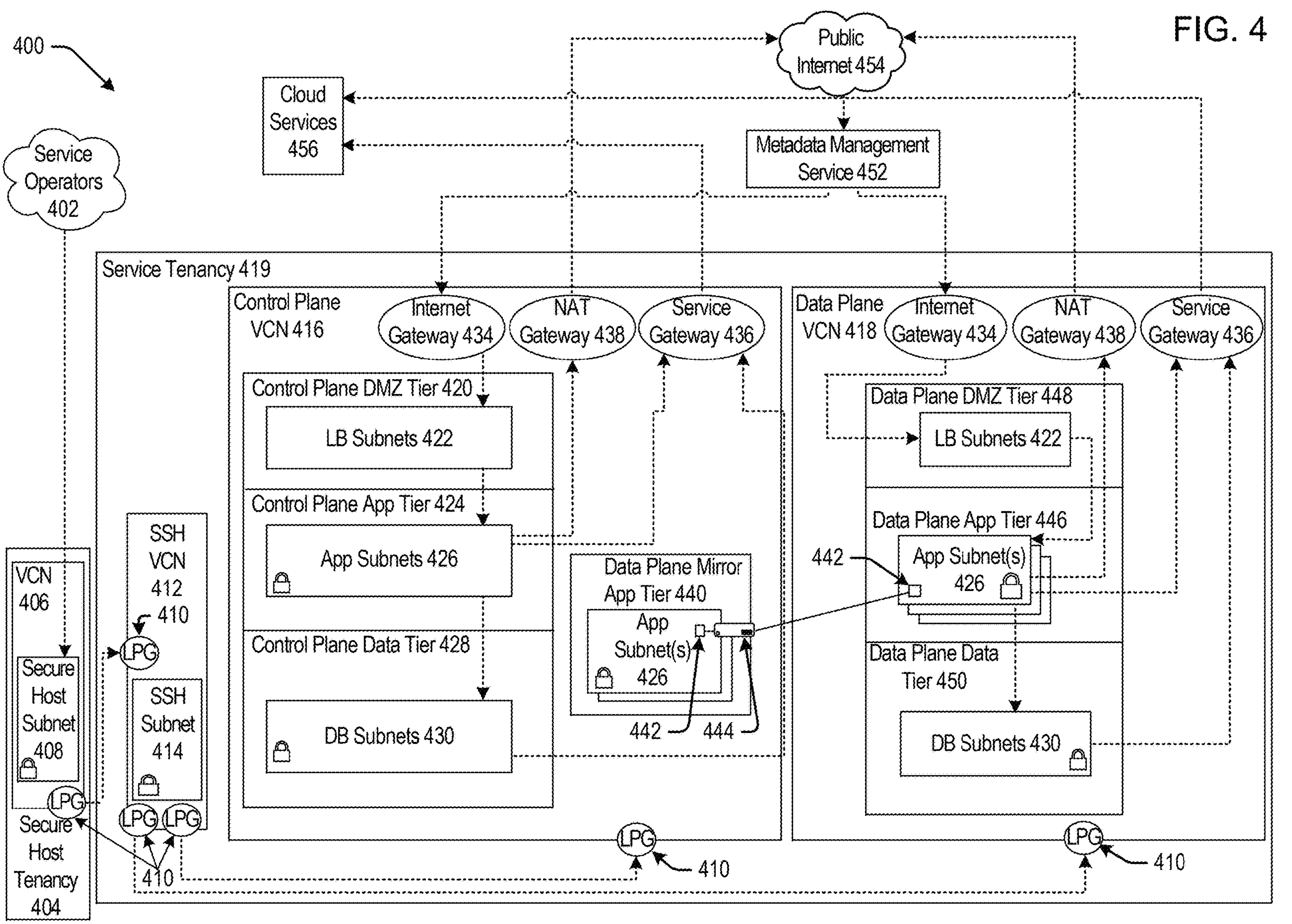
FIG. 4
400
Service Operators 402
Cloud Services 456
Public Internet 454
Metadata Management Service 452
Service Tenancy 419
Control Plane VCN 416
Internet Gateway 434
NAT Gateway 438
Service Gateway 436
Control Plane DMZ Tier 420
LB Subnets 422
Control Plane App Tier 424
App Subnets 426
Control Plane Data Tier 428
DB Subnets 430
Data Plane Mirror App Tier 440
App Subnet(s) 426
442
444
Data Plane VCN 418
Data Plane DMZ Tier 448
Data Plane App Tier 446
Data Plane Data Tier 450
VCN 406
Secure Host Subnet 408
Secure Host Tenancy 404
SSH VCN 412
SSH Subnet 414
LPG
410

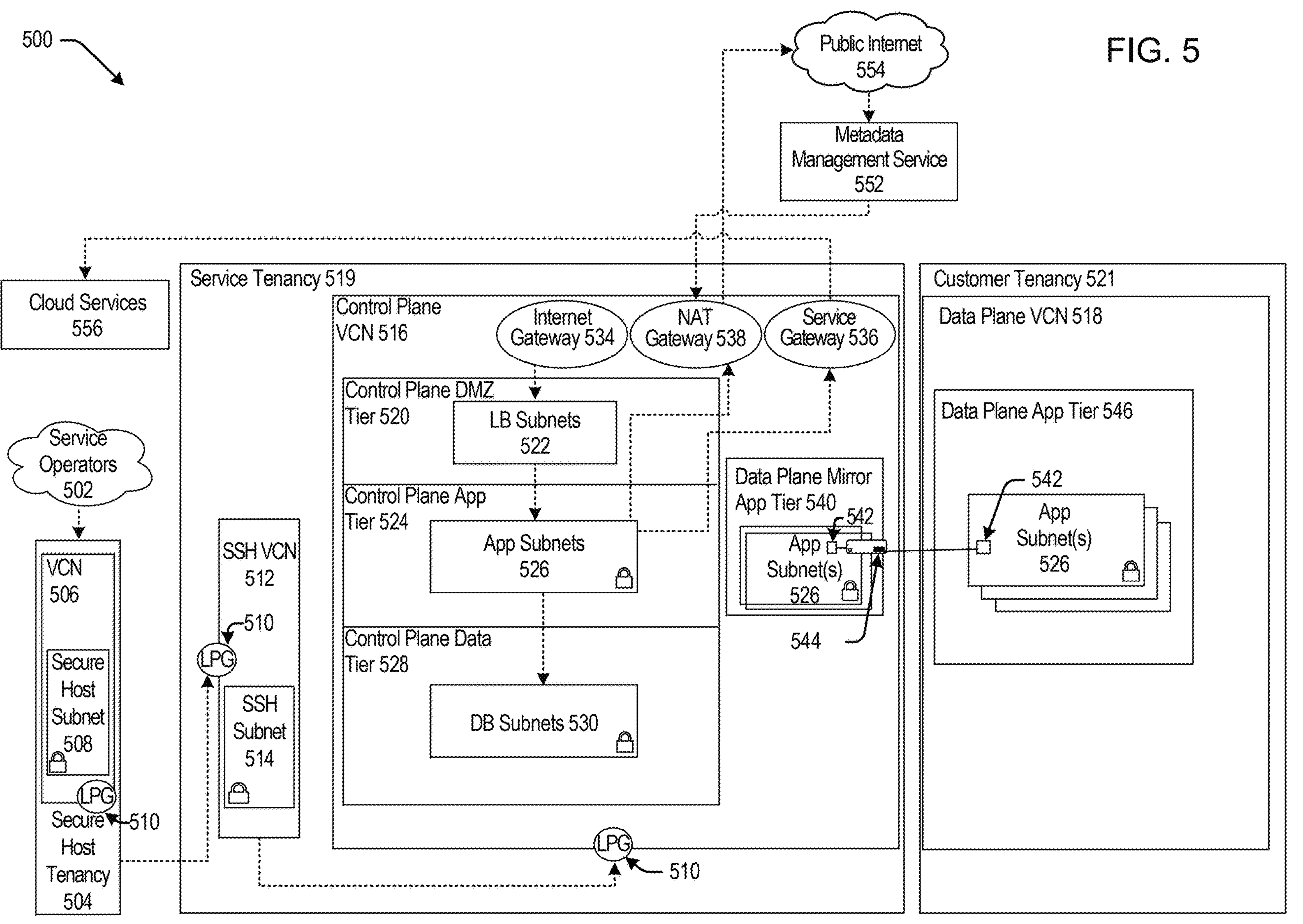
FIG. 5
500
Public Internet 554
Metadata Management Service 552
Cloud Services 556
Service Operators 502
VCN 506
Secure Host Subnet 508
LPG
Secure Host Tenancy 504
510
Service Tenancy 519
SSH VCN 512
SSH Subnet 514
Control Plane VCN 516
Internet Gateway 534
NAT Gateway 538
Service Gateway 536
Control Plane DMZ Tier 520
LB Subnets 522
Control Plane App Tier 524
App Subnets 526
Control Plane Data Tier 528
DB Subnets 530
Data Plane Mirror App Tier 540
App Subnet(s) 526
542
544
Customer Tenancy 521
Data Plane VCN 518
Data Plane App Tier 546
App Subnet(s) 526

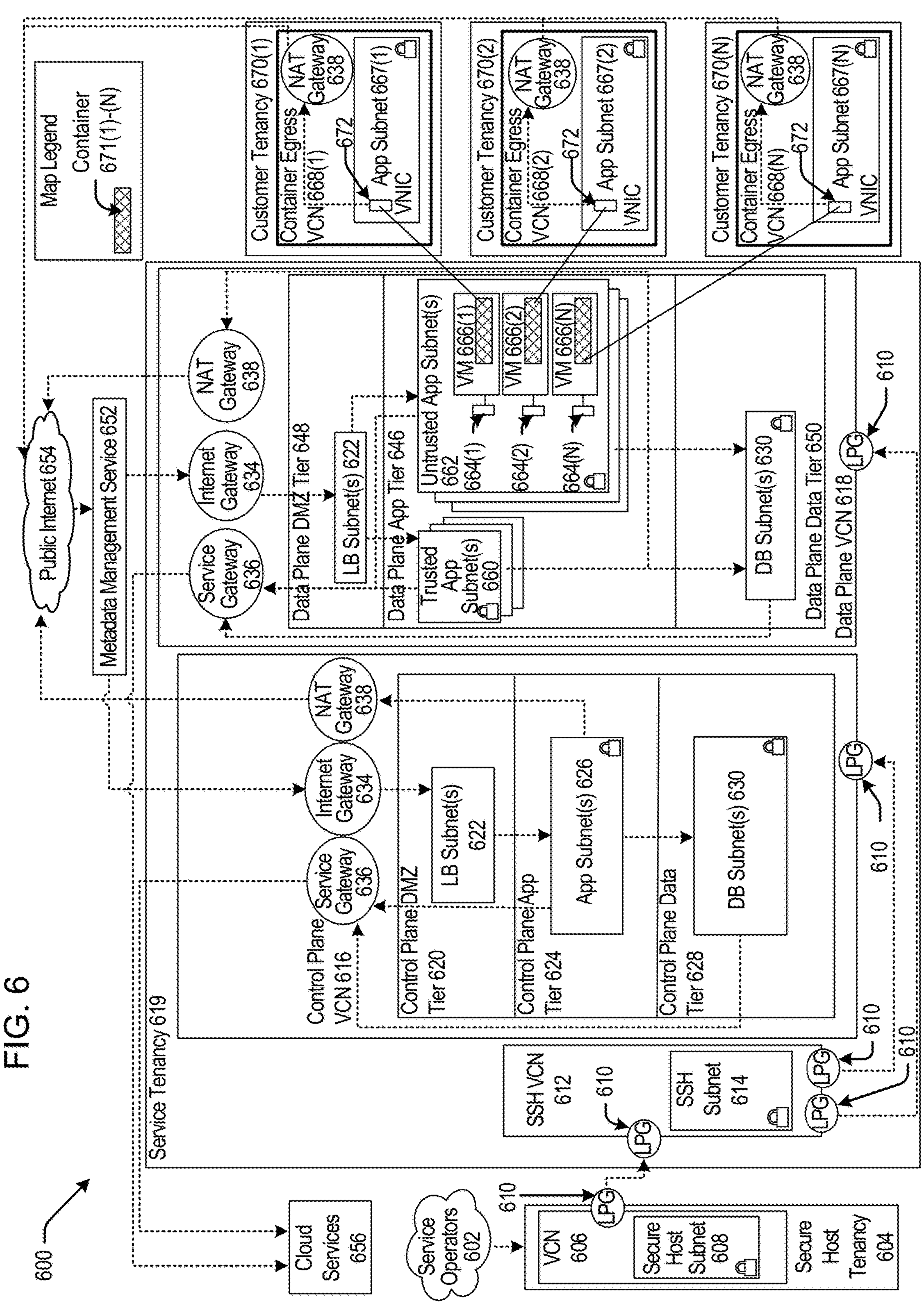
FIG. 6
600
Map Legend
Container 671(1)-(N)
Public Internet 654
Metadata Management Service 652
Customer Tenancy 670(1)
Customer Tenancy 670(2)
Customer Tenancy 670(N)
Container Egress VCN 668(1)
Container Egress VCN 668(2)
Container Egress VCN 668(N)
NAT Gateway 638
672
App Subnet 667(1)
App Subnet 667(2)
App Subnet 667(N)
VNIC
Service Gateway 636
Internet Gateway 634
Data Plane DMZ Tier 648
LB Subnet(s) 622
Data Plane App Tier 646
Trusted App Subnet(s) 660
Untrusted App Subnet(s) 662
664(1)
664(2)
664(N)
VM 666(1)
VM 666(2)
VM 666(N)
DB Subnet(s) 630
Data Plane Data Tier 650
Data Plane VCN 618
LPG
610
Control Plane VCN 616
Control Plane DMZ Tier 620
Control Plane App Tier 624
Control Plane Data Tier 628
App Subnet(s) 626
Service Tenancy 619
SSH VCN 612
SSH Subnet 614
Cloud Services 656
Service Operators 602
VCN 606
Secure Host Subnet 608
Secure Host Tenancy 604

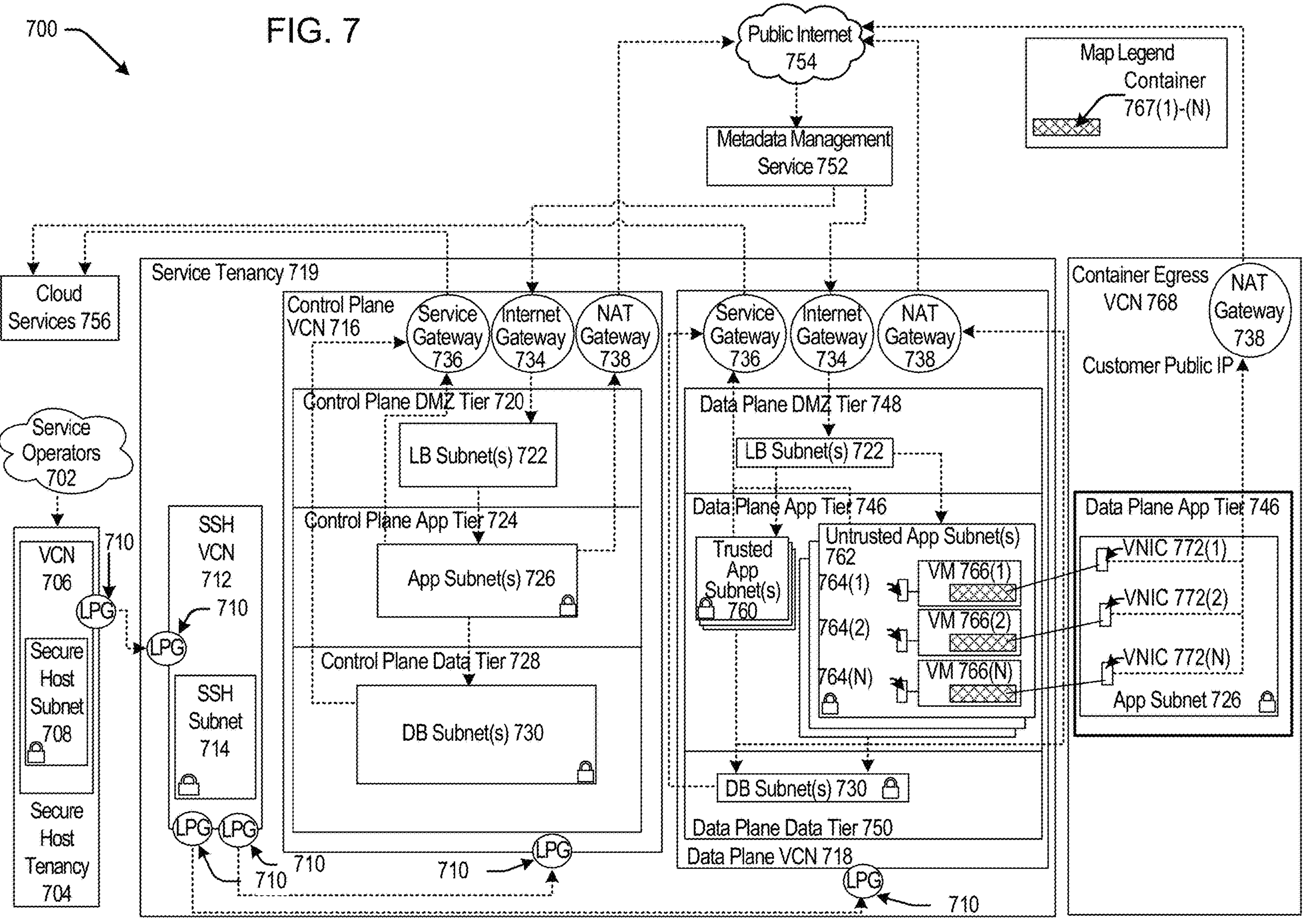
FIG. 7
700
Public Internet 754
Metadata Management Service 752
Map Legend
Container 767(1)-(N)
Cloud Services 756
Service Tenancy 719
Control Plane VCN 716
Service Gateway 736
Internet Gateway 734
NAT Gateway 738
Control Plane DMZ Tier 720
LB Subnet(s) 722
Control Plane App Tier 724
App Subnet(s) 726
Control Plane Data Tier 728
DB Subnet(s) 730
Service Gateway 736
Internet Gateway 734
NAT Gateway 738
Data Plane DMZ Tier 748
LB Subnet(s) 722
Data Plane App Tier 746
Trusted App Subnet(s) 760
Untrusted App Subnet(s) 762
764(1)
764(2)
764(N)
VM 766(1)
VM 766(2)
VM 766(N)
DB Subnet(s) 730
Data Plane Data Tier 750
Data Plane VCN 718
Container Egress VCN 768
NAT Gateway 738
Customer Public IP
Data Plane App Tier 746
VNIC 772(1)
VNIC 772(2)
VNIC 772(N)
App Subnet 726
Service Operators 702
VCN 706
LPG
710
Secure Host Subnet 708
Secure Host Tenancy 704
SSH VCN 712
SSH Subnet 714

TEXT SPAN PREDICTION BASED ON ENTITY TYPE

FIELD

The present disclosure relates generally to artificial intelligence techniques, and more particularly, to techniques for predicting the probability that a text span present within textual data should be assigned to an entity type of a set of predefined entity types.

BACKGROUND

Machine learning (ML) techniques can be utilized in many fields including, without limitation, the medical field. For example, natural language processing (NLP) ML techniques can be used to summarize large volumes of text, to perform automatic speech recognition, to identify PII/PHI information, and to perform other tasks. Data is an integral part of machine learning, as machine learning models typically require training on significant amounts of data to generate accurate output. Building reliable machine learning and other AI models also typically involves, at least in the case of supervised learning, labelling training data to add context and meaning that will allow a model trained on the labelled data to subsequently understand raw, unlabelled data. Labelling training data often involves annotation. There are various types of data annotation, such as for example, image annotation, video annotation, text annotation, etc. Of interest here is text annotation, which may be useful to, among other things, annotate textual medical datasets for entity classification and other reasons.

Text annotation commonly involves separating text into spans, which may be defined as a contiguous segment of text, such as individual words or sequences of words. Separating text into spans can be beneficial to many ML processes. For example, text may be separated into various spans prior to subjecting the text to named entity recognition (NER) techniques, such as NER techniques used to identify, and classify/categorize entity types present in the text. Entity type identification and classification may be useful for various natural language processing tasks, such as for example, relation extraction, question answering, and knowledge base population. Separating the text into spans prior to performing NER on the text can enhance the ability of a NER model to recognize and classify entity types. Unfortunately, span identification can be an extremely time consuming and tedious process that is frequently performed by human annotators. While online and other tools have been developed to assist human annotators with span identification, the process can still be arduous, particularly when considering the large volumes of textual data that are typically required to properly train a machine learning model.

BRIEF SUMMARY

Techniques disclosed herein relate generally to machine learning (ML) or, more broadly speaking, to artificial intelligence (AI). More specifically, techniques disclosed herein are directed to ML (textual/text) span prediction (hereinafter also "span prediction"). Span prediction can be thought of as a counterpart of the entity type classification process mentioned above. Whereas entity type classification is the process of predicting one or more entity types that can be assigned to an identified span of text, span prediction according to the present disclosure is the process of predicting the possible spans of text that can be assigned to a given entity type. To this end, an ML model can be trained to predict the probability that a given span of all possible spans within some text of interest (e.g., a document, etc.) should be assigned to a given entity type of a set of predefined entity types. In some examples, the trained span-prediction model may provide probabilities regarding the association of different spans to a given entity type of the set of entity types. In some examples, only the text span with the highest probability of association may be actually associated with/assigned to a given entity type. In other examples, several text spans with the highest probabilities of association may be actually associated with/assigned to a given entity type. The predicted spans can also be scored in some examples.

A span prediction ML model may be a neural network-based model. In some examples, the ML model may be a transformer-based model, such as a transformer-encoder model. The span prediction ML model may also be a pre-trained model. The initial training data for the span prediction model may be text data. For example, the text data may be a document including text in the form of multiple sentences of various word sequences. The text may be labelled to generate input data for training the span prediction ML model. For example, various spans within the text may be identified (mapped), and the text may be augmented to include different entity markers. In at least some examples, the span mappings and text augmentations may be produced by a human annotator. The entity markers may be used to indicate different entity types of a set of predefined entity types of interest. For example, and without limitation, the entity types may be medical classifications such as medicine name, medicine dosage, diagnosis, etc.

The input data (labelled text) can then be provided to the span prediction ML model for training. For example, the input data may be initially provided to an encoding layer of the span prediction ML model. The encoding layer of the span prediction model can generate a conceptualized representation of the input data. For example, the encoding layer of the span prediction ML model may generate a conceptualized representation of each span in the input data. Each conceptualized representation of a span may be augmented by the encoding layer of the span prediction ML model to include, for example, embedded entity marker tokens that indicate the beginning and end of the span.

The conceptualized span representations can then be provided to an entity prediction layer of the span prediction ML model, which may generate scalar representations of the spans. In some examples, the entity prediction layer of the span prediction ML model may include a feedforward network and a linear network. By using, for example, a sigmoid function, the entity prediction layer of the span prediction model can predict the probability that a given entity type should be assigned to a given span of the identified spans in the input data created from the text data. Using this predicted probability, the entity prediction layer of the span prediction model can then further predict the probability that a given span of the identified spans in the input data should be assigned to a given entity type of the set of predefined entity types.

With the span prediction model appropriately trained, model inference can be performed. During model inference, new text data, such as the text contained in a new document, can be input to the trained span prediction model. The trained span prediction model can resultantly predict the probability that a given span of all possible spans in the text should be assigned to a given entity type of the set of predefined entity types on which the span prediction model was trained. In some examples, the trained span prediction model can then assign the span with the highest predicted probability, or several spans with the highest predicted probabilities, to the entity type. In some examples, the trained span prediction model can also score explicit span representations for each entity type present in the text. Scoring explicit span representations with respect to entity types can improve upon entity type classification approaches that produce separate predictions about words or start and end markers. A given span can also be identified as a salient span by comparing its score in the text with a threshold score. This can be useful in future for tasks such as, for example, entity assignment, relationship building, co-reference resolution, etc. Predicting the probability that a span or spans should be assigned to a given entity type of a set of entity types can assist annotators in augmenting text for training AI models.

In various embodiments, a computer-implemented method is provided that includes: obtaining original data in the form of text comprising a sequence of words; constructing input data by identifying possible spans within the text and inserting entity marker tokens into the text to indicate locations of various entity types of a set of predefined entity types; training the machine learning model using the input data; inputting to the trained machine learning model, new text comprising a new sequence of words; identifying, by the trained machine learning model from all spans in the new text, a set of candidate spans for association with a given entity type of the set of predefined entity types on which the machine learning model was trained; predicting, by the trained machine learning model from the set of candidate spans, a subset of most appropriate spans for association with the given entity type; for each span of the subset of most appropriate spans, generating, by the trained machine learning model, a value indicating a predicted probability that the span is appropriate for association with the given entity type; and assigning, by the trained machine learning model, the predicted probability values to the respective spans of the subset of most appropriate spans.

In some embodiments, training the machine learning model includes: generating, by an encoding layer of the machine learning model, a conceptualized representation of each span in the input data that includes embedded typed entity marker tokens indicating a beginning and an end of the span; providing the conceptualized representations of the spans to an entity prediction layer of the machine learning model; predicting, by the entity prediction layer of the machine learning model, a probability that a given entity type of the set of predefined entity types, is appropriate for association with a given span; and using the predicted probability that a given entity type of the set of predefined entity types is appropriate for association with a given span to further predict, by the entity prediction layer of the machine learning model, the probability that one or more spans of all the spans in the new text are appropriate for association with the given entity type of the set of predefined entity types on which the machine learning model was trained.

In some embodiments, training the machine learning model includes optimizing a loss function defined by the formula:

$$\max \sum_{D} \sum_{\{e \in E\}} \left[ \pi_{\{s \in S_e\}} P(s \mid e, D) + \|\{\widehat{h_e} - h_e\}\|^2 \right]$$

where e is an entity type of a set of predefined entity types E, s is a span within a set of all possible spans S in the text, D is the sequence of words in the text, $h_e$ is an assumed number of spans associated with an entity type e, and $\widehat{h_e}$ is a predicted number of spans associated with the entity type e and can be represented by the formula:

$$\widehat{h_e} = RELU\left(w_e * \max - \text{pool}\left[g_1, \ldots, g_{\{h_e\}}\right| + b\right)$$

where $g_i$ is a suitable embedding of a given span $s_i$, $1 \leq i \geq h_e$, $h_e = |S_e|$, and $S_e$ is a set of spans amongst a set of identified candidate spans that is predicted to be most appropriate for association with the entity type e, and a sigmoid function σ is used to generate a probability that a given entity type e of the set of predefined entity types E is appropriate for association with the given span $s_i$. Predicting the probability that a given span $s_i$ within the set of most appropriate spans $S_e$ should be associated with the given entity type e of the set of predefined entity types E can subsequently accomplished using the formula:

$$P(S_e \mid e, D) = \prod_{\{s_i \in S_e\}} P(s_i \mid e, D) = \lambda \prod_{\{s_i \in S_e\}} P(e \mid s_i, D)$$

where λ is a constant of proportionality.

In some embodiments, the trained machine learning model further predicts a number of spans that will be associated with an entity type in the new text according to the formula:

$$\widehat{h_{\sigma}} = RELU(w_e[\max - \text{pool}[g'_1, \ldots, g'_N] + b).$$

In some embodiments, the machine learning model is based on a pre-trained transformer-encoder language model; an encoding layer of the machine learning model generates a conceptualized representation of each span in the input data and augments the input data with the typed entity marker tokens; and the conceptualized span representations are forwarded to a span prediction layer of the machine learning model to produce corresponding scalar representations.

In some embodiments, the computer-implemented method further includes associating with the given entity type, at least a span of the subset of most appropriate spans having a highest assigned predicted probability value.

In some embodiments, the computer-implemented method further includes scoring each span according to the formula:

$$\text{Score}(s) = [\sum_{\{e_i \in E, e_i \neq \epsilon\}} P(s \mid e_i, d)]/(|E|)$$

where s is a span within the set of all possible spans S, and $e_i$ is a given entity of the set of predefined entities E and is assigned to the span s.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 4 is a block diagram illustrating one pattern for implementing a cloud infrastructure as a service system, according to at least one embodiment.

FIG. 5 is a block diagram illustrating another pattern for implementing a cloud infrastructure as a service system, according to at least one embodiment.

FIG. 6 is a block diagram illustrating another pattern for implementing a cloud infrastructure as a service system, according to at least one embodiment.

FIG. 7 is a block diagram illustrating another pattern for implementing a cloud infrastructure as a service system, according to at least one embodiment.

DETAILED DESCRIPTION

Figure 1:
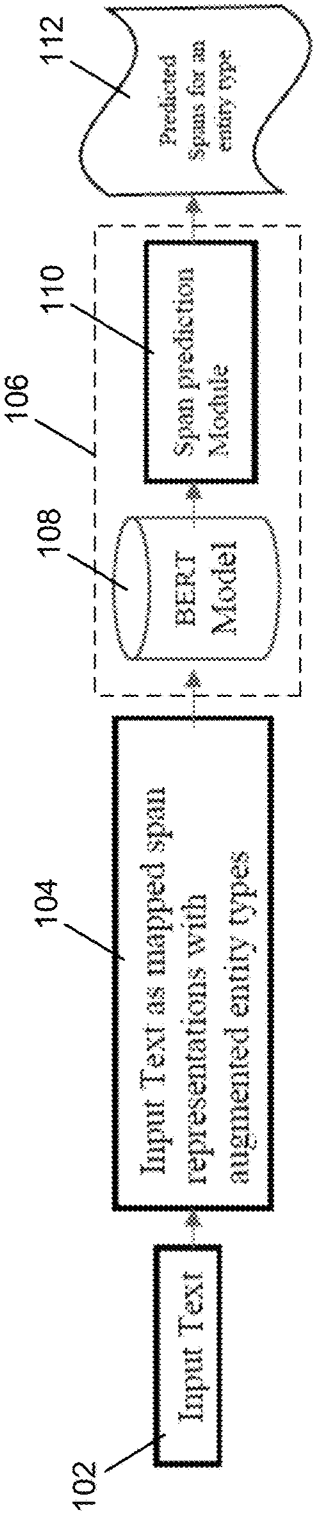
FIG. 1 illustrates a process flow for a training a machine learning model to perform span prediction for entities in text.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Machine learning (ML) and other artificial intelligence (AI) techniques have many natural language processing (NLP) applications. In a medical setting, AI can be broadly applied to drug discovery, and can be used to diagnose disease, to predict disease, to provide a disease prognosis, to identify potential drug interactions, for medical imaging analysis, and for other purposes. AI may also be usable to improve doctor-patient communications, patient care, or the patient experience, such as by function as a physician's assistant or otherwise. ML techniques such as named entity recognition (NER) techniques can be used to identify and classify entities in medical and other text. Machine learning models can also be trained for automatic speech recognition, summarization, and personal identifiable information (PII) or protected health information (PHI) detection.

In order for a machine learning model to perform textual NLP operations, the machine learning model must be able to recognize and understand the meaning of text as written by humans. For example, when a machine learning model is used in a medical setting for entity extraction, summarization, PII/PHI detection, etc., the machine learning model must be able to recognize and understand medical-related entities in text. A machine learning model can be trained for this purpose, but training typically requires large amounts of labelled data, and labelled data suitable for training a machine learning model in this manner is commonly generated by human annotators. Accordingly, helping annotators recognize different text spans that are appropriate for association with given entity types can improve the accuracy and efficiency of the data labelling process.

In various embodiments, a computer-implemented method is provided that includes: obtaining original data in the form of text comprising a sequence of words; constructing input data by identifying possible spans within the text and inserting entity marker tokens into the text to indicate locations of various entity types of a set of predefined entity types; training the machine learning model using the input data; inputting to the trained machine learning model, new text comprising a new sequence of words; identifying, by the trained machine learning model from all spans in the new text, a set of candidate spans for association with a given entity type of the set of predefined entity types on which the machine learning model was trained; predicting, by the trained machine learning model from the set of candidate spans, a subset of most appropriate spans for association with the given entity type; for each span of the subset of most appropriate spans, generating, by the trained machine learning model, a value indicating a predicted probability that the span is appropriate for association with the given entity type; and assigning, by the trained machine learning model, the predicted probability values to the respective spans of the subset of most appropriate spans.

In some instances, training the machine learning model includes: generating, by an encoding layer of the machine learning model, a conceptualized representation of each span in the input data that includes embedded typed entity marker tokens indicating a beginning and an end of the span; providing the conceptualized representations of the spans to an entity prediction layer of the machine learning model; predicting, by the entity prediction layer of the machine learning model, a probability that a given entity type of the set of predefined entity types, is appropriate for association with a given span; and using the predicted probability that a given entity type of the set of predefined entity types is appropriate for association with a given span to further predict, by the entity prediction layer of the machine learning model, the probability that one or more spans of all the spans in the new text are appropriate for association with the given entity type of the set of predefined entity types on which the machine learning model was trained.

Span Prediction

In order to improve the process of labelling text for training machine learning models, the approaches described herein are operative to predict one or more spans in text data that are appropriate for association with a given entity of a set of predefined entities of interest. More specifically, the approaches described herein are operative to identify a set of candidate spans from all possible spans in the text, predict a subset of most appropriate spans within the set of candidate spans, and generate for each span of the subset of most appropriate spans, a value indicating a predicted probability that each of the most appropriate spans are actually appropriate for association with a given entity of a set of predefined entities of interest. The predicted probability values can also be assigned to the spans and may be used to determine which one, or ones, of the most appropriate spans are associated with the various entity types.

A. Input Framework

The text used to train a span prediction machine learning (ML) model to perform span prediction may be a document. The document can be represented as a sequence of words $D=\{w_1, w_2, \ldots, w_n\}$, from which can be constructed a set of all possible within-sentence word sequence spans $S=\{s_1, s_2, \ldots, s_N\}$. The span length can vary from, for example, one word, to a pair of words, to a longer sequence of words. When a span is a longer sequence of words, the overall length of the span may extend from a sequence of words of length (W−n)/2 prior to the beginning of the span to a sequence of words of length (W−n)/2 after the end of the span, where W is a predetermined width (number of words) and n is the length of the sequence of words D.

A.1. Input Data Preparation

FIG. 1 illustrates one example of a process flow 100 for a training a span prediction ML model to perform span prediction for entities in text 102. The text 102, which as mentioned above, may be a sequence of words in a document, can be pre-processed by labelling the text to generate input data for training the span prediction ML model. Labelling of the text can add context or meaning or can be used to otherwise augment the text in a manner that makes the resulting input data 104 more understandable to the span prediction ML model 106. For example, as indicated, labelling may include identifying/mapping various spans within the text and adding different entity markers to the text. In at least some examples, text labelling may be performed by a human annotator. The entity markers may be used to indicate different entity types of a set of predefined entity types of interest. In some examples, the entity types may be medical-related entity types. For example, the entity types may include biomedical information, personal identifying information, personal health information, and combinations thereof. Biomedical entity types may include, without limitation, classifications such as medicine name, medicine dosage, medicine frequency, diagnosis, etc.

A.2. Model Training

Subsequent to its construction as described above, the input data 104 can be provided to the span prediction ML model 106, as indicated in FIG. 1. The span prediction ML model 106 may be a neural network model and may include a layer based on a transformer model or a transformer-encoder model. In the example of FIG. 1, the span prediction ML model 106 includes an encoding layer 108 based on a bidirectional encoder representations from transformers (BERT) transformer-encoder model, which is pre-trained for natural language processing. Other transformer-based models may be usable as a base model for the span prediction ML model 106 in other embodiments. The BERT model may be finetuned during training to generate the desired text span predictions.

During training, the encoding layer 108 of the span prediction ML model 106 can generate a conceptualized representation of the input data generated from the labelled text. The encoding layer 108 of the span prediction ML model 106 may generate a conceptualized representation of each labelled span in the input data. In some examples, each conceptualized representation of a span may be augmented by the encoding layer 108 of the span prediction ML model 106 to include, for example, embedded typed entity marker tokens that indicate the beginning and end of the span. In some examples, the encoding layer 108 may be used to obtain a contextualized representation $x_t$ of each span associated with an input token $x_t$ in the input data. In some examples, the contextualized representation for a span $s_i$ may be represented by the formula:

$$h_e(s_i) = [x_{\{start(i)\}}, x_{\{end(i)\}}, \phi(s_i)],$$

where $\phi(s_i) \in R^d$ represents a learned embedding of span width features, and $x_{\{start\ (i)\}}$ and $x_{\{end(i)\}}$ represent an embedding of the start and end positions of the span $s_i$.

Once the contextualized span representations have been generated by the encoding layer 108 of the span prediction ML model 106, the contextualized span representations may be provided to a span prediction module 110 of the span prediction ML model 106. The encoding layer 108 of the span prediction ML model 106 can generate scalar representations $$z_e^i$$

of the spans.

The span prediction ML model 106 is trained for the task of span prediction based on entity types. Span prediction based on entity type may be useful, for example, to aid an annotator in determining and marking all possible spans to be assigned to a given entity type. In some examples, use of a trained span prediction ML model can be integrated with other annotation tools, such as annotation tools having a graphical user interface, to make text annotation easier for a human annotator.

In one formal definition of a named entity recognition problem (i.e., an entity type classification problem), E denotes a set of predefined entity types. The entity types may be medical-related entity types as described above. The named entity recognition task may be described as, for every span $s_i$ within a set of all possible spans S (i.e., $s_i \in S$), predict an entity type e (i.e., $y_e(s_i) \in E$), or $y_e(s_i) = \in$ (which represents the fact that $s_i$ does not represent an entity or represents a null entity). The output of this task is a set of augmented entities that may be represented as $Y_e=\{(s_i, e): s_i \in S, e \in E\}$. These augmented entities may also be referred to as a set of labelled entities.

In contrast, span prediction can be described as predicting, for each entity type e in the set of predefined entity types E (i.e., $e \in E$), a subset of spans within a set of identified candidate spans (i.e., $S_e \subseteq S$) that is most appropriate for association with/assignment to the entity type e. One example of such span prediction is illustrated below.

Example 1

| EHR |
| --- |
| Assessment: hypertensive, hyperuricemia. |
| Advised Telmisartan 40 mg BDPC, Febuxostat 40 mg OD |
| Entity type list: |
| Medicine_name, Medicine_dosage, Medicine_frequency, Diagnosis . . . |

Example 1 represents certain medical information presented by the text of an electronic health record (EHR). It can be understood from the EHR that a physician or another medical professional assessed a patient to be hypertensive and to have hyperuricemia. The EHR also indicates that the patient was advised to take 40 mg of the medicine Telmisartan twice a day post meals, and to take 40 mg of the medicine Febuxostat once a day. Further according to this example, the set of predefined entity types E can include, among other entity types e, Diagnosis, Medicine_Name, Medicine_Dosage, and Medicine_Frequency. Consequently, in this example, it can be predicted that the spans "hypertensive" and "hyperuricemia" can be appropriately associated with the entity type "Diagnosis," the spans "Telmisartan" and "Febuxostat" can be appropriately associated with the entity type "Medicine_name," the span "40 mg" can be appropriately associated with the entity type "Medicine_dosage," and the spans "BDPC" and "OD" can be appropriately associated with the entity type "Medicine_frequency."

Training examples of the span prediction ML model 106 to perform span prediction may involve optimizing a loss function—i.e., optimizing modeling of the input data by the span prediction ML model 106. As a goal of span prediction is to predict a set of most appropriate spans ($S_e$) amongst all candidate spans in the text for associating an entity $e \in E$ with the spans, a probability distribution may be defined over all possible candidate spans in the text given the entity e and sequence of words D, and may be represented as P (s|e, D). However, because more than one span can be appropriately associated with the same entity e, the probability distribution may be represented as P ($S_e$|e, D). The probability distribution of spans can further be decomposed into $P(S_e|e, D)=\Pi_{\{s \in S_e\}}P(s|e, D)$, and it is understood from Bayes' theorem that the probability distribution of a span with respect to an entity type can be expressed in terms of the probability distribution of the entity type with respect to the span—i.e., $P(s|e, D) \propto P(e|s, D)$, and $(s|e, D)=\lambda \cdot P(e|s, D)$, where λ is the constant of proportionality. Thus, the probability distribution P (s|e, D) can be computed, such as with a trained neural model, even though the neural model may have been oppositely trained as described below.

The number of spans $h_e$ that will be associated with a given entity type e can also be assumed for model training. Maximization of the loss function can then be represented by the formula:

$$\max \sum_D \sum_{\{e \in E\}} \left[ \prod_{\{s \in S_e\}} P(s \mid e, D) + \|\{\widehat{h_e} - h_e\}\|^2 \right]$$

where P(s|e, D) can subsequently be replaced with λ·P (e|s, D).

In the above formula, $\widehat{h_e}$ is a predicted number of spans that will be associated with a given entity type e and can be represented by the formula:

$$\widehat{h_e} = RELU\left(w_e * \max - \text{pool}\left[g_1, \ldots , g_{|h_e|}\right] + b\right)$$

where $g_i$ is a suitable embedding of a given span $s_i$, $1 \leq i \leq h_e$, $h_e = |S_e|$, and $S_e$ is a set of spans amongst a set of identified candidate spans that is predicted to be most appropriate for association with the entity type e.

As described above, the encoding layer 108 of the span prediction ML model 106 can, during model training, generate a conceptualized representation of the input data. Additionally, the generated contextualized span representations can be provided to the span prediction module 110 of the span prediction ML model 106 to generate scalar representations of the spans. A sigmoid function σ can then be used to generate a probability that a given entity type e of the set of predefined entity types E is appropriate for association with the given span $s_i$ (i.e., $p(e|s_i, D)$). As a further element of model training, the span prediction module 110 of the span prediction ML model 106 can thereafter subsequently predict a probability that a given span $s_i$ within the set of most appropriate spans $S_e$ is appropriate for association with the given entity type e of the set of predefined entity types E using the formula:

$$P(S_e \mid e, D) = \prod_{\{s_i \in S_e\}} P(s_i \mid e, D) = \lambda \prod_{\{s_i \in S_e\}} P(e \mid s_i, D)$$

where λ is a constant.

A.3. Model Inference

As indicated at 112 in FIG. 1, once the fully trained span prediction ML model has been constructed, inference may be performed. Inference can be initiated by inputting to the trained span prediction ML model, new text comprising a new sequence of words. The model inference process can cause the trained span prediction ML model 106 to identify a set of candidate spans, and to generate a value indicating a predicted probability that each span of a subset of most appropriate spans within the set of candidate spans is appropriate for association with a given entity type of the set of predefined entity types. In other words, for an entity type e' in new text (e.g., a new document/sequence or words d'), the trained span prediction model can predict P (s|e', d') for all s E S. The trained span prediction ML model may also assign the predicted probability values to the respective spans of the subset of most appropriate spans.

As part of the span prediction process, the trained span prediction ML model 106 can also predict a number of spans that will be associated with an entity type in the new text according to the formula: $\widehat{h_{e'}}$=RELU ($w_e$[max-pool [$g_1$', . . . , $g_N$']+b). The trained span prediction ML model 106 may further select one or more top spans of a subset of most appropriate spans within the set of candidate spans $s_1$, $s_2$, . . . , $S_{\{\widehat{h_{\{e'\}}}\}}$ based on predicted probability values P (s|e', d').

A.4. Span Assignment to Entities

The EHR of previous Example 1 is reproduced below for the purpose of illustrating generation and assignment of predicted probability values to respective spans of a predicted subset of most appropriate spans.

| EHR |
| --- |
| Assessment: hypertensive, hyperuricemia. |
| Advised Telmisartan 40 mg BDPC, Febuxostat 40 mg OD |
| Entity type list: |
| Medicine_name, Medicine_dosage, Medicine_frequency, Diagnosis . . . |

In this example, assume that "hypertensive" and "Telmisartan" are two spans in a predicted subset of most appropriate spans associated with the text of the EHR. A trained span prediction ML model might then generate a value indicating a predicted probability that each of the "hypertensive" and "Telmisartan" spans is appropriate for association with each of the four entity types identified in EHR as follows: P(hypertensive|Diagnosis)=0.86, P(hypertensive|Medicine_name)=0.23, P(hypertensive|Medicine_dosage)=0.21, P(hypertensive|Medicine_frequency)=0.19, P(Telmisartan|Medicine_name)=0.72, P(Telmisartan|Medicine_dosage)=0.69, P(Telmisartan|Medicine_frquency)=0.65, P(Telmisartan|Diagnosis)=0.21. Therefore, the span "hypertensive" is associated with/assigned to the entity type "Diagnosis" and the span "Telmisartan" is associated with/assigned to the entity type "Medicine_name" because those span associations have the highest predicted probability value. In some examples, it is also possible that a given span s may not be associated with/assigned to any entity type, or it may be considered that a span is assigned to null entity e. In such a case:

$$P(s \mid \epsilon) = \max_{\{e \in E \cup \{\epsilon\}\}} P(s \mid e).$$

One example of the non-assignment or null assignment of a span is illustrated by the predicted span-to-entity type associations represented in Example 2 below.

Example 2

From labelled text data, the following has been identified: Spans="cardiovascular," "symptoms," "denies," "denies chest pain," "denies lightheadedness," and "denies palpitations."

Entity Types="Anatomical_site," "Header," and "Sign_symptom."

In this example, appropriate and assigned span-to-entity type associations are "cardiovascular" ("Anatomical_site"), "symptoms" ("Header"), "denies chest pain" ("Sign_symptom"), "denies lightheadedness" ("Sign_symptom"), "denies palpitations" ("Sign_symptom"). However, according to this example, the predicted probability value that the span "denies" is appropriate for association with the entity type "Anatomical_site" is 0.31, the predicted probability value that the span "denies" is appropriate for association with the entity type "Sign_symptom" is 0.22, and the predicted probability value that the span "denies" is appropriate for association with the entity type "Header" is 0.13. Therefore, the span "denies" is not assigned to any of the entity types.

A.5. Salient Span Determination Using Span Enumeration

A trained span prediction ML model can also assign a score to each span within the set of all possible spans in the new text. In at least one example, the score may be represented by the formula:

$$\text{Score}(s) = \Big[\sum_{\{e_i \in E, e_i \neq \epsilon\}} P(s \mid e_i, d)\Big] / (|E|)$$

where $e_i$ is assigned to span s. The spans can then be ranked/shortlisted for use as salient spans by comparing their scores to a threshold score. Salient spans may be used for future tasks, such as for example, entity assignment, relation prediction, co-reference resolution etc.

To illustrate the concept of a "salient span," assume that the span "denies chest pain" in Example 2 and its related sub-spans "denies," "chest," "pain," "chest pain," and "denies chest," are scored by the above span scoring algorithm as follows: Score (denies)=0.09, Score (chest)=0.34, Score (pain)=0.528, Score (chest pain)=0.31, Score (denies chest)=0.13 etc. If, for example, the threshold score is set as 0.25, then the spans, "chest," "pain," and "chest pain" would be considered to be salient spans.

A.6. Span Refining Module

During model inference, it may be possible to predict conflicting spans for the same given entity type. Consequently, examples of a span prediction ML model may include a span refining module to resolve such conflicts in a case-based manner. Spans may conflict in several ways, as illustrated by the example cases below, where each example case considers for purposes of illustration, two spans $s_1$ and $s_2$, both of which are mapped to entity type e. In these example cases, it is assumed that the length of a span is defined as the number of words appearing in the span.

Case 1: span $s_1$ is a sub-span of span $s_2$ as illustrated below:

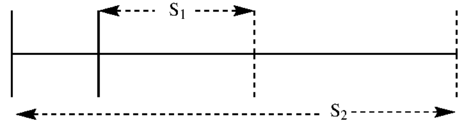

In this case span $s_1$ can be identified with span $s_2$, and thus only span $s_2$ is considered and associated with the entity type e. However if span $s_1$ is also mapped to another entity type (e'≠e), span $s_1$ can also be mapped to the entity type e'.

One example of Case 1 may involve the span "left kidney pole," where both the spans "left kidney pole" and the sub-span "kidney" get mapped to the entity type "Anatomical_site." However, because the span "kidney" is captured within the span "left kidney pole," the span "kidney" can be ignored and only the span "left kidney pole" need be associated with the "Anatomical_site" entity type.

Case 2: span $s_1$ overlaps with span $s_2$ as illustrated below:

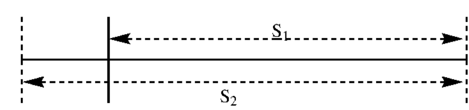

In this case span $s_1$ can again be identified with span $s_2$, and thus only span $s_2$ is considered and associated with the entity type e. One example of Case 2 may involve the span "right femur neck," where both the spans "right femur neck" and the sub-span "femur neck" are associated with the entity type "Anatomical_site." However, because the span "femur neck" is captured within the span "right femur neck," the span "femur neck" can be ignored and only the span "right femur neck" need be associated with the "Anatomical_site" entity type.

Case 3: span $s_1$ is separated from span $s_2$ by a separating span having a span length less than or equal to 2 as illustrated below:

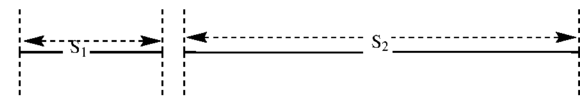

In this case, the separating span is not associated with any other entity type and consists of only stop words. As such, span $s_1$ can be conjoined with span $s_2$ to generate a new span $s_3$ and one can continue to work with the new span $s_3$, which is assumed to be associated with the entity type e. Otherwise no changes need to be made. One example of Case 3 may involve the span, "upper lobe of left lung". Here, the span "upper lobe" is associated with the entity type "Anatomical_site," and "left lung" is also associated with the entity "Anatomical_site." In this case the entire span "upper lobe of left lung" (which can be considered as a single span) is associated with the entity type "Anatomical_site."

A.7. Neural Network-Based Model

Figure 2:
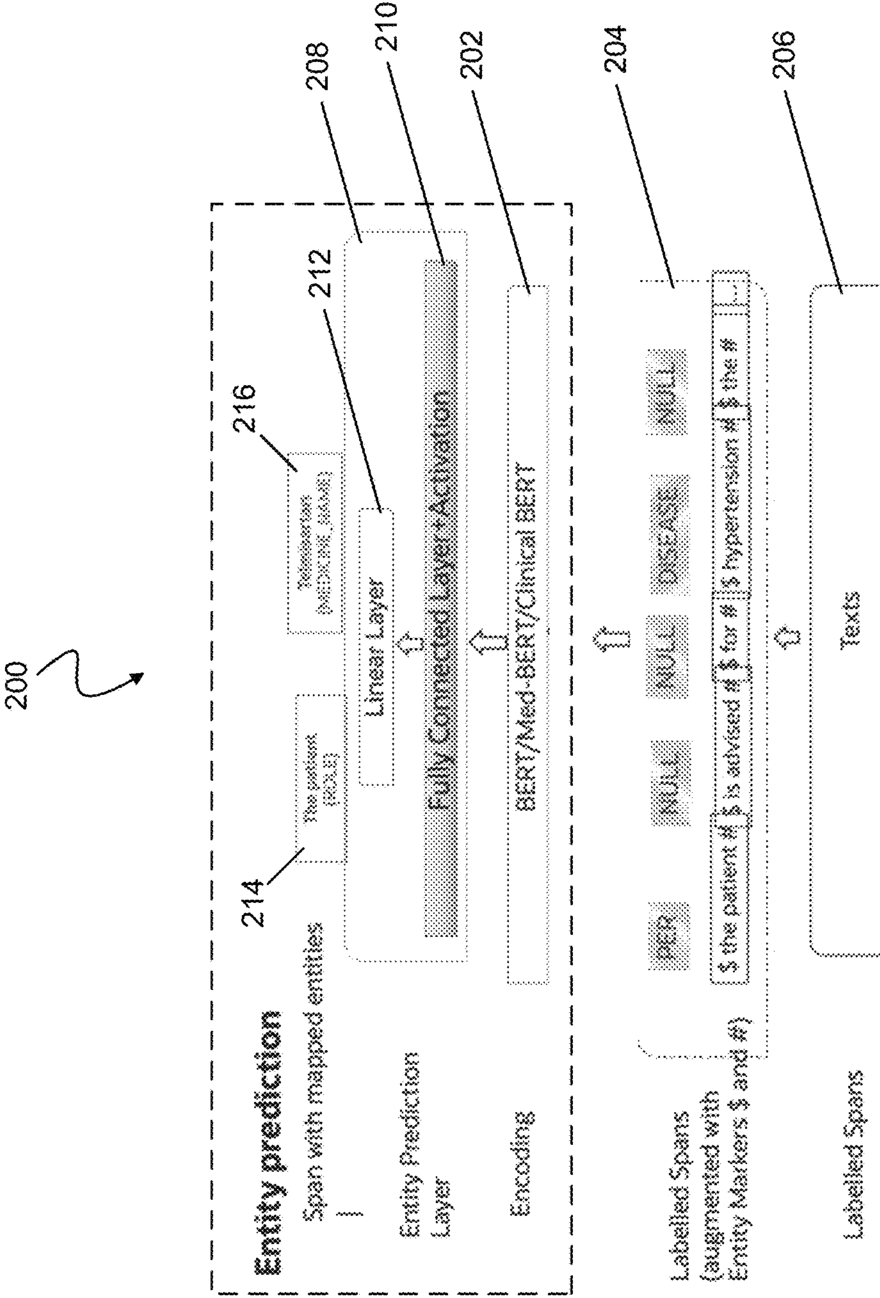
FIG. 2 represents a neural network machine learning model that can be trained to perform span prediction for entities in text.

As represented in FIG. 2, a span prediction model 200 may be neural network-based model in some examples. In the example of FIG. 2, the neural network span prediction model 200 includes an encoding layer 202. The encoding layer 202 may be based on a transformer model, such as but not limited to the aforementioned bidirectional encoder representations from transformers (BERT) described above. The encoding layer 202 of the neural network span prediction model 200 can generate a conceptualized representation of each entity marker-augmented span in the input data 204 created from labelled text data 206. In some examples, each conceptualized representation of a span may also be augmented by the encoding layer 202 to include, for example, embedded typed entity marker tokens that indicate the beginning and end of the span as previously described.

The neural network span prediction model 200 can also include an entity prediction layer 208. In this example, the entity prediction layer 208 comprises a fully connected layer 210 followed by a linear layer 212. The conceptualized representation of each entity marker-augmented span can be provided to the entity prediction layer 208 by the encoding layer 202, whereafter scalar representations of the spans can be generated. The entity prediction layer 208 also performs the probabilistic predictive functions described herein, and assigns entity types to spans during model training. For example, as illustrated in FIG. 2 at 214, the entity prediction layer 208 has assigned the entity type "role" to the span "the patient," and at 216 has assigned the entity type "Medicine_Name" to the span "Telmisartan."

Once the neural network span prediction model 200 has been trained, the entity prediction layer 208 can function oppositely to identify from all spans in new text input thereto, a set of candidate spans for association with a given entity type of the set of predefined entity types on which the machine learning model was trained. The entity prediction layer 208 can also predict from the set of candidate spans, a subset of most appropriate spans for association with the given entity type, and for each span of the subset of most appropriate spans, can generate a value indicating a predicted probability that the span is appropriate for association with the given entity type. The entity prediction layer 208 can also assign the predicted probability values to the respective spans of the subset of most appropriate spans.

B. Use of Span Prediction ML Model

Figure 3:
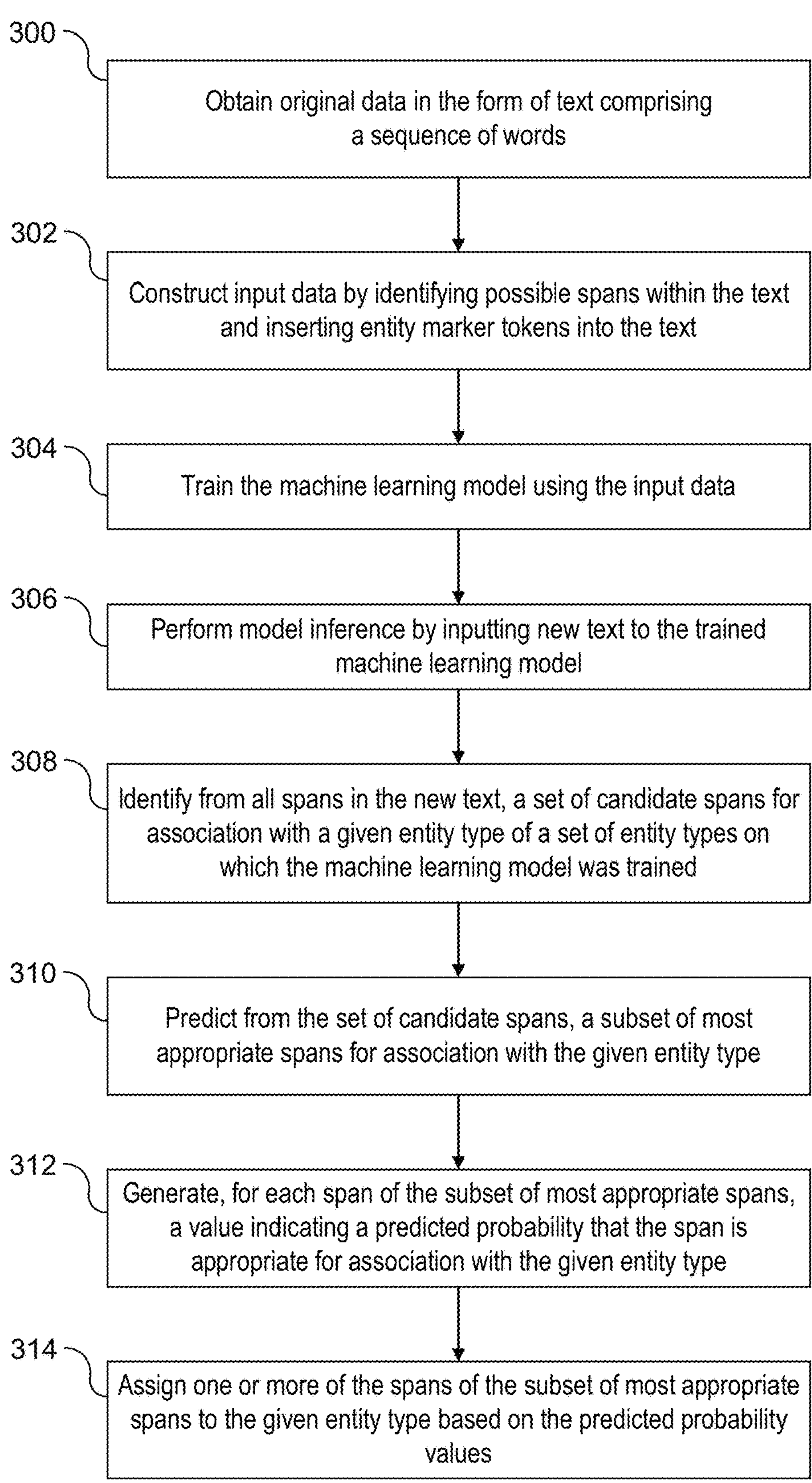
FIG. 3 illustrates a detailed process flow for training a machine learning model to perform span prediction for entities in text.

One example of a method for span prediction is represented in the flowchart of FIG. 3. As indicated at block 300 thereof, original data in the form of text comprising a sequence of words can be obtained for training a machine learning model to predict spans. The text may be provided in the form of a document. The document may be, but is not required to be, a medical-related document containing for example, biomedical information, PII information, PHI information, or combinations thereof.

Input data may next be constructed, as indicated at block 302, by labelling the text. Text labelling may include identifying possible spans within the text and inserting entity marker tokens into the text. The entity markers may be used to indicate locations of various entity types of a set of predefined entity types. In some examples, text labelling may be performed by a human annotator with or without the assistance of automated/online annotation tools. In other examples, text labelling may be performed in whole or in part by ML annotators.

The machine learning model can then be trained using the input data, as represented at block 304. In some examples, training the machine learning model can include generating, by an encoding layer of the machine learning model, a conceptualized representation of each span in the input data that includes embedded typed entity marker tokens indicating a beginning and an end of the span. In some examples, training the machine learning model can also include providing the conceptualized representations of the spans to an entity prediction layer of the machine learning model, and predicting, by the entity prediction layer of the machine learning model, a probability that a given entity type of the set of predefined entity types, is appropriate for association with a given span. Training the machine learning model can additionally include using the predicted probability that a given entity type of the set of predefined entity types is appropriate for association with a given span to further predict, by the entity prediction layer of the machine learning model, the probability that one or more spans of all the spans in the new text are appropriate for association with the given entity type of the set of predefined entity types on which the machine learning model was trained.

As indicated at block 306, inference can then be performed on the trained machine learning model by inputting to the machine learning model, new text comprising a new sequence of words. The new sequence of words may, but are not required to be, contained in a new document. The new document may be, but is not required to be, a medical-related document containing for example, biomedical information, PII information, PHI information, or combinations thereof. As indicated in block 308, during inference, the trained machine learning model can identify, from all spans in the new text, a set of candidate spans for association with a given entity type of the set of predefined entity types on which the machine learning model was trained. The trained machine learning model can ten predict, from the set of candidate spans, a subset of most appropriate spans for association with the given entity type, as represented at block 310.

As represented in block 312, the trained machine learning model nay then generate, for each span of the subset of most appropriate spans, a value indicating a predicted probability that the span is appropriate for association with the given entity type. The trained machine learning model can thereafter assign one or more of the spans of the subset of most appropriate spans to the given entity type based on the predicted probability values, as indicated in block 314.

Illustrative Systems

Infrastructure as a service (IaaS) is one particular type of cloud computing that can be used to implement the various techniques described herein for generating synthetic doctor-patient conversations using medical knowledge graphs and/or doctor-patient conversation summaries to guide and control the synthetic doctor-patient conversation generation process. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively coupled to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Metadata that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

FIG. 5 is a block diagram 500 illustrating another example pattern of an IaaS architecture, according to at least one embodiment. Service operators 502 (e.g., service operators 402 of FIG. 4) can be communicatively coupled to a secure host tenancy 504 (e.g., the secure host tenancy 404 of FIG. 4) that can include a virtual cloud network (VCN) 506 (e.g., the VCN 406 of FIG. 4) and a secure host subnet 508 (e.g., the secure host subnet 408 of FIG. 4). The VCN 506 can include a local peering gateway (LPG) 510 (e.g., the LPG 410 of FIG. 4) that can be communicatively coupled to a secure shell (SSH) VCN 512 (e.g., the SSH VCN 412 of FIG. 4) via an LPG 410 contained in the SSH VCN 512. The SSH VCN 512 can include an SSH subnet 514 (e.g., the SSH subnet 414 of FIG. 4), and the SSH VCN 512 can be communicatively coupled to a control plane VCN 516 (e.g., the control plane VCN 416 of FIG. 4) via an LPG 510 contained in the control plane VCN 516. The control plane VCN 516 can be contained in a service tenancy 519 (e.g., the service tenancy 419 of FIG. 4), and the data plane VCN 518 (e.g., the data plane VCN 418 of FIG. 4) can be contained in a customer tenancy 521 that may be owned or operated by users, or customers, of the system.

The control plane VCN 516 can include a control plane DMZ tier 520 (e.g., the control plane DMZ tier 420 of FIG. 4) that can include LB subnet(s) 522 (e.g., LB subnet(s) 422 of FIG. 4), a control plane app tier 524 (e.g., the control plane app tier 424 of FIG. 4) that can include app subnet(s) 526 (e.g., app subnet(s) 426 of FIG. 4), a control plane data tier 528 (e.g., the control plane data tier 428 of FIG. 4) that can include database (DB) subnet(s) 530 (e.g., similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g., the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g., the service gateway 436 of FIG. 4) and a network address translation (NAT) gateway 538 (e.g., the NAT gateway 438 of FIG. 4). The control plane VCN 516 can include the service gateway 536 and the NAT gateway 538.

The control plane VCN 516 can include a data plane mirror app tier 540 (e.g., the data plane mirror app tier 440 of FIG. 4) that can include app subnet(s) 526. The app subnet(s) 526 contained in the data plane mirror app tier 540 can include a virtual network interface controller (VNIC) 542 (e.g., the VNIC of 442) that can execute a compute instance 544 (e.g., similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g., the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g., the metadata management service 452 of FIG. 4) that can be communicatively coupled to public Internet 554 (e.g., public Internet 454 of FIG. 4). Public Internet 554 can be communicatively coupled to the NAT gateway 538 contained in the control plane VCN 516. The service gateway 536 contained in the control plane VCN 516 can be communicatively coupled to cloud services 556 (e.g., cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

FIG. 6 is a block diagram 600 illustrating another example pattern of an IaaS architecture, according to at least one embodiment. Service operators 602 (e.g., service operators 402 of FIG. 4) can be communicatively coupled to a secure host tenancy 604 (e.g., the secure host tenancy 404 of FIG. 4) that can include a virtual cloud network (VCN) 606 (e.g., the VCN 406 of FIG. 4) and a secure host subnet 608 (e.g., the secure host subnet 408 of FIG. 4). The VCN 606 can include an LPG 610 (e.g., the LPG 410 of FIG. 4) that can be communicatively coupled to an SSH VCN 612 (e.g., the SSH VCN 412 of FIG. 4) via an LPG 610 contained in the SSH VCN 612. The SSH VCN 612 can include an SSH subnet 614 (e.g., the SSH subnet 414 of FIG. 4), and the SSH VCN 612 can be communicatively coupled to a control plane VCN 616 (e.g., the control plane VCN 416 of FIG. 4) via an LPG 610 contained in the control plane VCN 616 and to a data plane VCN 618 (e.g., the data plane 418 of FIG. 4) via an LPG 610 contained in the data plane VCN 618. The control plane VCN 616 and the data plane VCN 618 can be contained in a service tenancy 619 (e.g., the service tenancy 419 of FIG. 4).

The control plane VCN 616 can include a control plane DMZ tier 620 (e.g., the control plane DMZ tier 420 of FIG. 4) that can include load balancer (LB) subnet(s) 622 (e.g., LB subnet(s) 422 of FIG. 4), a control plane app tier 624 (e.g., the control plane app tier 424 of FIG. 4) that can include app subnet(s) 626 (e.g., similar to app subnet(s) 426 of FIG. 4), a control plane data tier 628 (e.g., the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g., the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g., the service gateway of FIG. 4) and a network address translation (NAT) gateway 638 (e.g., the NAT gateway 438 of FIG. 4). The control plane VCN 616 can include the service gateway 636 and the NAT gateway 638.

The data plane VCN 618 can include a data plane app tier 646 (e.g., the data plane app tier 446 of FIG. 4), a data plane DMZ tier 648 (e.g., the data plane DMZ tier 448 of FIG. 4), and a data plane data tier 650 (e.g., the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g., public Internet 454 of FIG. 4).

The Internet gateway 634 contained in the control plane VCN 616 and contained in the data plane VCN 618 can be communicatively coupled to a metadata management service 652 (e.g., the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively coupled to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

FIG. 7 is a block diagram 700 illustrating another example pattern of an IaaS architecture, according to at least one embodiment. Service operators 702 (e.g., service operators 402 of FIG. 4) can be communicatively coupled to a secure host tenancy 704 (e.g., the secure host tenancy 404 of FIG. 4) that can include a virtual cloud network (VCN) 706 (e.g., the VCN 406 of FIG. 4) and a secure host subnet 708 (e.g., the secure host subnet 408 of FIG. 4). The VCN 706 can include an LPG 710 (e.g., the LPG 410 of FIG. 4) that can be communicatively coupled to an SSH VCN 712 (e.g., the SSH VCN 412 of FIG. 4) via an LPG 710 contained in the SSH VCN 712. The SSH VCN 712 can include an SSH subnet 714 (e.g., the SSH subnet 414 of FIG. 4), and the SSH VCN 712 can be communicatively coupled to a control plane VCN 716 (e.g., the control plane VCN 416 of FIG. 4) via an LPG 710 contained in the control plane VCN 716 and to a data plane VCN 718 (e.g., the data plane 418 of FIG. 4) via an LPG 710 contained in the data plane VCN 718. The control plane VCN 716 and the data plane VCN 718 can be contained in a service tenancy 719 (e.g., the service tenancy 419 of FIG. 4).

The control plane VCN 716 can include a control plane DMZ tier 720 (e.g., the control plane DMZ tier 420 of FIG. 4) that can include LB subnet(s) 722 (e.g., LB subnet(s) 422 of FIG. 4), a control plane app tier 724 (e.g., the control plane app tier 424 of FIG. 4) that can include app subnet(s) 726 (e.g., app subnet(s) 426 of FIG. 4), a control plane data tier 728 (e.g., the control plane data tier 428 of FIG. 4) that can include DB subnet(s) 730 (e.g., DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g., the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 4) and a network address translation (NAT) gateway 738 (e.g., the NAT gateway 438 of FIG. 4). The control plane VCN 716 can include the service gateway 736 and the NAT gateway 738.

The data plane VCN 718 can include a data plane app tier 746 (e.g., the data plane app tier 446 of FIG. 4), a data plane DMZ tier 748 (e.g., the data plane DMZ tier 448 of FIG. 4), and a data plane data tier 750 (e.g., the data plane data tier 450 of FIG. 4). The data plane DMZ tier 748 can include LB subnet(s) 722 that can be communicatively coupled to trusted app subnet(s) 760 (e.g., trusted app subnet(s) 660 of FIG. 6) and untrusted app subnet(s) 762 (e.g., untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g., public Internet 454 of FIG. 4).

The Internet gateway 734 contained in the control plane VCN 716 and contained in the data plane VCN 718 can be communicatively coupled to a metadata management service 752 (e.g., the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively coupled to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
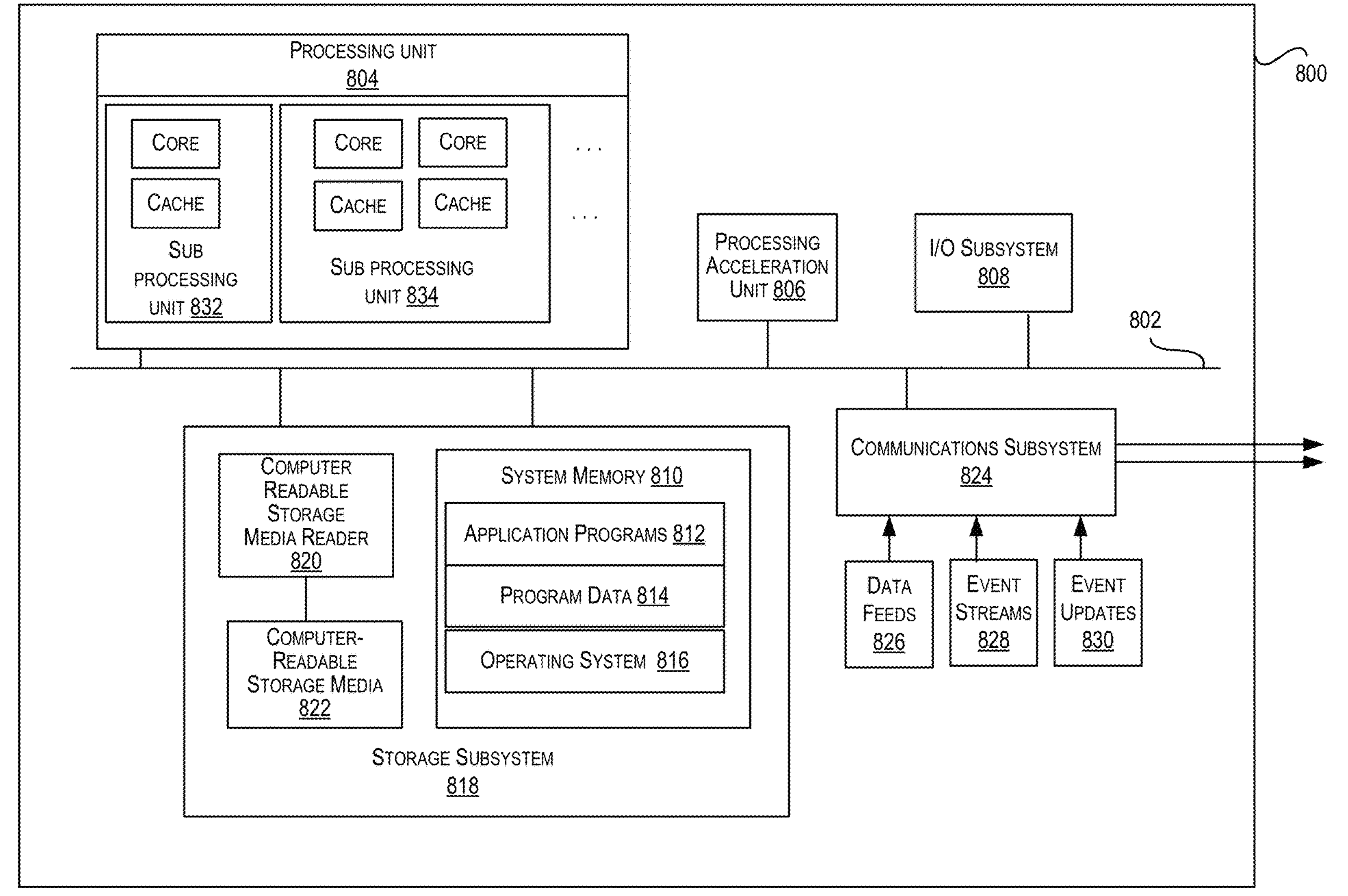
FIG. 8 is a block diagram illustrating an example computer system, according to at least one embodiment.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 804 provide the functionality described above. Storage subsystem 818 may also provide a repository for storing data used in accordance with the present disclosure.

As depicted in the example in FIG. 8, storage subsystem 818 can include various components including a system memory 810, computer-readable storage media 822, and a computer readable storage media reader 820. System memory 810 may store program instructions (e.g., application programs 812) that are loadable and executable by processing unit 804. System memory 810 may also store program data 814 that is used during the execution of the instructions and/or data that is generated during the execution of the program instructions. Various different kinds of programs may be loaded into system memory 810 including but not limited to client applications, Web browsers, mid-tier applications, relational database management systems (RDBMS), virtual machines, containers, etc.

System memory 810 may also store an operating system 816. Examples of operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 800 executes one or more virtual machines, the virtual machines along with their guest operating systems (GOSs) may be loaded into system memory 810 and executed by one or more processors or cores of processing unit 804.

System memory 810 can come in different configurations depending upon the type of computer system 800. For example, system memory 810 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 810 may include a basic input/output system (BIOS) containing basic routines that help to transfer information between elements within computer system 800, such as during start-up.

Computer-readable storage media 822 may represent remote, local, fixed, and/or removable storage devices plus storage media for temporarily and/or more permanently containing, storing, computer-readable information for use by computer system 800 including instructions executable by processing unit 804 of computer system 800.

Computer-readable storage media 822 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Machine-readable instructions executable by one or more processors or cores of processing unit 804 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

obtaining original data as text comprising a sequence of words;

constructing input data by identifying possible spans within the text and inserting entity marker tokens into the text to indicate locations of various entity types of a set of predefined entity types;

training a machine learning model using the input data to generate a trained machine learning model, the machine learning model comprising an encoding layer that is based on a pre-trained transformer-encoder language model and generates a conceptualized representation of each span in the input data, the conceptualized representation including embedded typed entity marker tokens indicating a beginning and an end of each span, and a span prediction layer including a fully connected layer and a linear layer, wherein the machine learning model is trained by optimizing a loss function that jointly maximizes a probability of correct span selection for each entity type and minimizes a difference between predicted and actual numbers of spans associated with each entity type;

inputting to the trained machine learning model, new text comprising a new sequence of words;

identifying, by the trained machine learning model from all spans in the new text, a set of candidate spans for association with a given entity type of the set of predefined entity types on which the machine learning model was trained;

predicting, by the trained machine learning model from the set of candidate spans, a subset of most appropriate spans for association with the given entity type;

for each span of the subset of most appropriate spans, generating, by the trained machine learning model, a value indicating a predicted probability that the span is appropriate for association with the given entity type; and assigning, by the trained machine learning model, one or more of the spans of the subset of most appropriate spans to the given entity type based on the predicted probability values.

2. The computer-implemented method of claim 1, wherein training the machine learning model further includes:

providing the conceptualized representations of the spans to an entity prediction layer of the machine learning model;

predicting, by the entity prediction layer of the machine learning model, a probability that the given entity type of the set of predefined entity types, is appropriate for association with a given span; and using the predicted probability that the given entity type of the set of predefined entity types is appropriate for association with the given span to further predict, by the entity prediction layer of the machine learning model, the probability that one or more spans of all the spans in the new text are appropriate for association with the given entity type of the set of predefined entity types on which the machine learning model was trained.

3. The computer-implemented method of claim 1, wherein training the machine learning model further includes:

optimizing the loss function defined by:

$$\max \sum_{D} \sum_{\{e \in E\}} \left[ \prod_{\{s \in S_e\}} P(s \mid e, D) + \| (\widehat{h_e} - h_e) \|^2 \right]$$

where e is an entity type of a set of predefined entity types E, s is a span within a set of all possible spans S in the text, D is the sequence of words in the text, $h_e$ is an assumed number of spans associated with the entity type e, and $\hat{h}_e$ is a predicted number of spans associated with the entity type e and can be represented by:

$$\hat{h}_e = RELU\left(w_e * \max - \text{pool}\left[g_1, \ldots, g_{\{h_e\}}\right] + b\right)$$

where $g_i$ is a suitable embedding of a given span $s_i$, 1≤; i≤; $h_e$, $h_e = |S_e|$, and $S_e$ is a set of spans amongst a set of identified candidate spans that is predicted to be most appropriate for association with the entity type e;

using a sigmoid function σ to generate a probability that the given entity type e of the set of predefined entity types E is appropriate for association with the given span $s_i$; and subsequently predicting a probability that the given span $s_i$ within the set of most appropriate spans $S_e$ is appropriate for association with the given entity type e of the set of predefined entity types E according to the equation:

$$P(S_e \mid e, D) = \prod_{\{s_i \in S_e\}} P(s_i \mid e, D) = \lambda \prod_{\{s_i \in S_e\}} P(e \mid s_i, D)$$

where λ is a constant of proportionality.

4. The computer-implemented method of claim 1, wherein the trained machine learning model further predicts a number of spans that will be associated with an entity type in the new text according to the equation:

$$\hat{h}_e = RELU(w_e[\max - \text{pool}[g'_1, \ldots, g'_N] + b).$$

5. The computer-implemented method of claim 1, wherein;

the conceptualized span representations are forwarded to the span prediction layer of the machine learning model to produce corresponding scalar representations.

6. The computer-implemented method of claim 1, further comprising associating with the given entity type, at least a span of the subset of most appropriate spans having a highest assigned predicted probability value.

7. The computer-implemented method of claim 1, further comprising scoring each span according to the equation:

$$\text{Score}(s) = [\sum_{\{e_i \in E, e_i \neq \epsilon\}} P(s \mid e_i, d)]/(|E|).$$

where s is a span within a set of all possible spans S, and $e_i$ is a given entity of the set of predefined entities E and is assigned to the span s.

8. The computer-implemented method of claim 1, further comprising:

scoring each of the spans in the new text using a defined scoring function based on predicted probability values for each entity type;

selecting, as salient spans, spans with scores exceeding a predetermined threshold; and outputting a set of the salient spans.

9. A system comprising:

one or more data processors; and one or more non-transitory computer readable media storing instructions which, when executed by the one or more data processors, cause the one or more data processors to perform operations including:

obtaining original data as text comprising a sequence of words;

constructing input data by identifying possible spans within the text and inserting entity marker tokens into the text to indicate locations of various entity types of a set of predefined entity types;

training a machine learning model using the input data to generate a trained machine learning model, the machine learning model comprising an encoding layer that is based on a pre-trained transformer-encoder language model and generates a conceptualized representation of each span in the input data, the conceptualized representation including embedded typed entity marker tokens indicating a beginning and an end of each span, and a span prediction layer including a fully connected layer and a linear layer, wherein the machine learning model is trained by optimizing a loss function that jointly maximizes a probability of correct span selection for each entity type and minimizes a difference between predicted and actual numbers of spans associated with each entity type;

inputting to the trained machine learning model, new text comprising a new sequence of words;

identifying, by the trained machine learning model from all spans in the new text, a set of candidate spans for association with a given entity type of the set of predefined entity types on which the machine learning model was trained;

predicting, by the trained machine learning model from the set of candidate spans, a subset of most appropriate spans for association with the given entity type;

for each span of the subset of most appropriate spans, generating, by the trained machine learning model, a value indicating a predicted probability that the span is appropriate for association with the given entity type; and assigning, by the trained machine learning model, one or more of the spans of the subset of most appropriate spans to the given entity type based on the predicted probability values.

10. The system of claim 9, wherein the predefined entity types are selected from a group consisting of biomedical information, personal identifying information, personal health information, and combinations thereof.

11. The system of claim 9, wherein a span length is selected from a group consisting of a single word, a pair of words, and an extended sequence of words having a length (W−n)/2 prior to a beginning of the span and a sequence of words having a length (W−n)/2 after an end of the span, where W is a pre-determined number of words and n is the length of the text D.

12. The system of claim 11, wherein the span length does not exceed 5 words.

13. The system of claim 9, wherein training the machine learning model further includes:

providing the conceptualized representations of the spans to the span prediction layer to produce corresponding scalar representations;

predicting, by the span prediction layer, a probability that the given entity type of the set of predefined entity types, is appropriate for association with a given span; and using the predicted probability that the given entity type of the set of predefined entity types is appropriate for association with the given span to further predict, by the span prediction layer, the probability that one or more spans of all the spans in the new text are appropriate for association with the given entity type of the set of predefined entity types on which the machine learning model was trained.

14. The system of claim 9, wherein the machine learning model further includes a span refining layer, and the instructions further cause the one or more data processors to refine conflicts between two spans separated by a stop word or two overlapping spans of the subset of most appropriate spans that are associated with a same given entity type by (1) adjoining the two spans, which were separated by the stop word, or (2) filtering out a shorter span of the two overlapping spans and maintaining, in the subset of most appropriate spans, a longer span of the two overlapping spans.

15. A computer-program product tangibly embodied in one or more non-transitory machine-readable media storing instructions configured that, when executed by one or more data processors, cause the one or more data processors to perform operations including:

obtaining original data as text comprising a sequence of words;

constructing input data by identifying possible spans within the text and inserting entity marker tokens into the text to indicate locations of various entity types of a set of predefined entity types;

training the machine learning model using the input data, to generate a trained machine learning model, the machine learning model comprising an encoding layer that is based on a pre-trained transformer-encoder language model and generates a conceptualized representation of each span in the input data, the conceptualized representation including embedded typed entity marker tokens indicating a beginning and an end of each span, and a span prediction layer including a fully connected layer and a linear layer, wherein the machine learning model is trained by optimizing a loss function that jointly maximizes a probability of correct span selection for each entity type and minimizes a difference between predicted and actual numbers of spans associated with each entity type;

inputting to the trained machine learning model, new text comprising a new sequence of words;

identifying, by the trained machine learning model from all spans in the new text, a set of candidate spans for association with a given entity type of the set of predefined entity types on which the machine learning model was trained;

predicting, by the trained machine learning model from the set of candidate spans, a subset of most appropriate spans for association with the given entity type;

for each span of the subset of most appropriate spans, generating, by the trained machine learning model, a value indicating a predicted probability that the span is appropriate for association with the given entity type; and assigning, by the trained machine learning model, one or more of the spans of the subset of most appropriate spans to the given entity type based on the predicted probability values.

16. The computer-program product of claim 15, wherein the predefined entity types are selected from a group consisting of biomedical information, personal identifying information, personal health information, and combinations thereof.

17. The computer-program product of claim 15, wherein a span length is selected from a group consisting of a single word, a pair of words, and an extended sequence of words having a length (W−n)/2 prior to a beginning of the span and a sequence of words having a length (W−n)/2 after an end of the span, where W is a pre-determined number of words, n is the length of the text D, and the span length does not exceed 5 words.

18. The computer-program product of claim 15, wherein training the machine learning model further includes:

providing the conceptualized representations of the spans to the span prediction layer to produce corresponding scalar representations;

predicting, by the span prediction layer, a probability that the given entity type of the set of predefined entity types, is appropriate for association with a given span; and using the predicted probability that the given entity type of the set of predefined entity types is appropriate for association with the given span to further predict, by the span prediction layer, the probability that one or more spans of all the spans in the new text are appropriate for association with the given entity type of the set of predefined entity types on which the machine learning model was trained.

19. The computer-program product of claim 15, wherein the machine learning model further includes a span refining layer, and the instructions further cause the one or more data processors to refine conflicts between two spans separated by a stop word or two overlapping spans of the subset of most appropriate spans that are associated with a same given entity type by (1) adjoining the two spans, which were separated by the stop word, or (2) filtering out a shorter span of the two overlapping spans and maintaining, in the subset of most appropriate spans, a longer span of the two overlapping spans.

* * * * *